United States Patent
Rosani et al.

(10) Patent No.: US 8,998,684 B2
(45) Date of Patent: Apr. 7, 2015

(54) APPARATUS FOR THE TOOLING OF A WORKPIECE

(75) Inventors: Giovanni Rosani, Brescia (IT); Gualtiero Barezzani, Concesio Brescia (IT); Gianpaolo Luciani, Brescia (IT)

(73) Assignee: Cembre S.p.A., Brescia (IT)

(*) Notice: Subject to any disclaimer, the term of this patent is extended or adjusted under 35 U.S.C. 154(b) by 63 days.

(21) Appl. No.: 13/513,645

(22) PCT Filed: Nov. 30, 2010

(86) PCT No.: PCT/EP2010/068563
§ 371 (c)(1),
(2), (4) Date: Jun. 11, 2012

(87) PCT Pub. No.: WO2011/067262
PCT Pub. Date: Jun. 9, 2011

(65) Prior Publication Data
US 2012/0238189 A1 Sep. 20, 2012

(30) Foreign Application Priority Data
Dec. 3, 2009 (WO) .............. PCT/IT2009/000542

(51) Int. Cl.
*B24B 23/00* (2006.01)
*B23Q 5/12* (2006.01)
*E01B 31/04* (2006.01)
*B23D 45/00* (2006.01)

(52) U.S. Cl.
CPC .............. *E01B 31/04* (2013.01); *B23D 45/006* (2013.01)

(58) Field of Classification Search
USPC .......................................... 451/347, 294, 241
See application file for complete search history.

(56) References Cited

U.S. PATENT DOCUMENTS

| 3,157,006 A * | 11/1964 | Dewey ........................... 451/294 |
| 3,783,561 A * | 1/1974 | Fortunski ....................... 451/294 |
| 4,068,415 A | 1/1978 | McIlrath |
| 2004/0033852 A1 | 2/2004 | Taomo et al. |

FOREIGN PATENT DOCUMENTS

| CH | 630 550 A5 | 6/1982 |
| WO | WO 2009/108094 A1 | 9/2009 |

* cited by examiner

*Primary Examiner* — Dung Van Nguyen
(74) *Attorney, Agent, or Firm* — Dickstein Shapiro LLP

(57) ABSTRACT

A portable apparatus (1) for the tooling of a workpiece (9) comprises a motor (3) with a cyclic movement output member (4), a tool holder (5) adapted to carry a tool (6) and a movement transmitter (7) engaging the motor output member (4) and the tool holder (5) to set the tool holder (5) in a cyclic movement, wherein the movement transmitter (7) comprises a transmission ratio adjuster (8) that, in response to a preset reduction of the cyclic movement speed ($\omega\_m$) of the output member (4) of the motor, increases the transmission ratio ($\omega\_m/\omega\_ph$) thereby reducing the cyclic movement speed ($\omega$ ph) of the tool holder (5) with respect to the cyclic movement speed ($\omega\_m$) of the output member (4) of the motor (3).

16 Claims, 11 Drawing Sheets

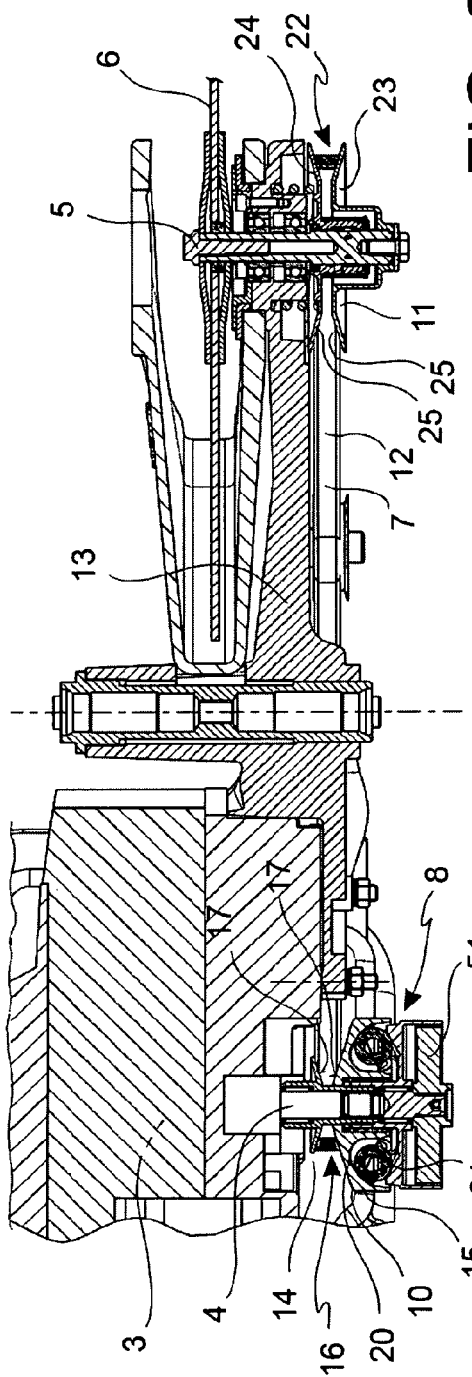
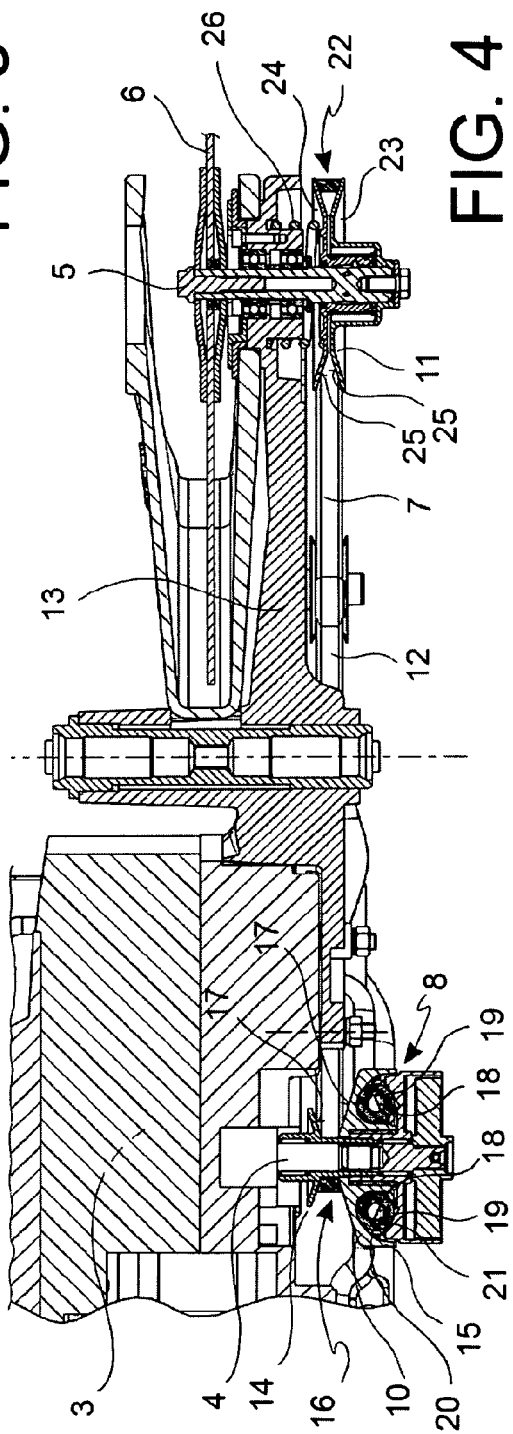

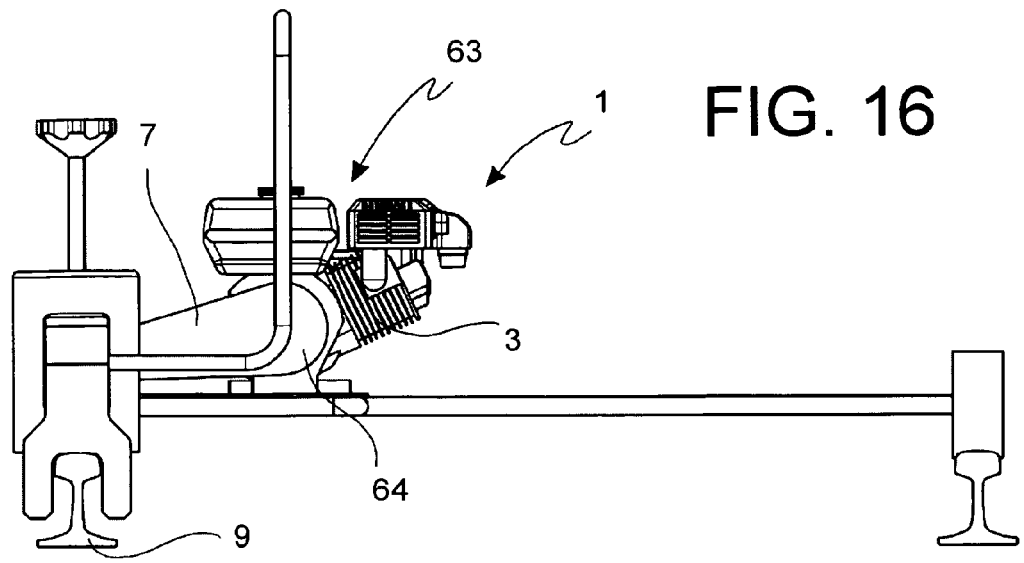
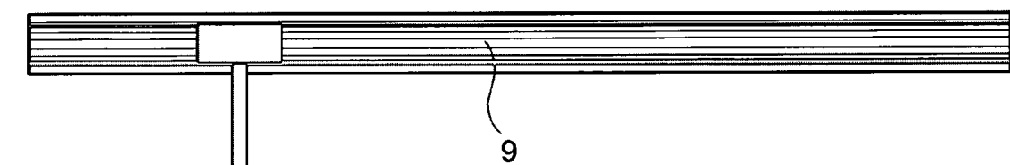
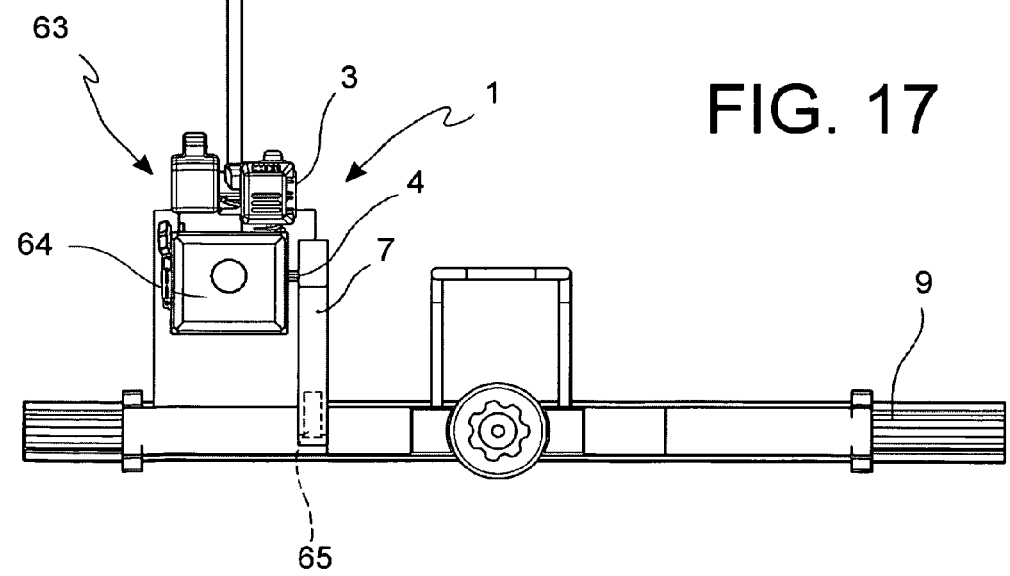

APPARATUS FOR THE TOOLING OF A WORKPIECE

The object of the present invention is an apparatus for the tooling of a workpiece, particularly a portable apparatus for the in situ tooling of a workpiece, such as for example the truncation of railway rails, drilling of railway rails, sawing of concrete or reinforced concrete railway sleepers, abrading or smoothing of welded rail junctions.

Within the context of the present description, the expression "tooling" defines a material removal process by means of a power-driven tool, e.g. a sharp cutting tool such as a drill, a sawing blade, a sawing chain, a sawing band, an abrasive disk, an emery wheel, a sanding disk etc. The tooling process may result in a shaping, planing, broaching, polishing, drilling and sawing of the workpiece, for instance steel, concrete, wood, rock, reinforced concrete etc. The "tooling" is intended to include operations in which the power-driven tool rotates or performes a generally cyclic or alternating movement to bring cutting edges to bear against the workpiece.

Hence, the invention relatas to an apparatus for the tooling of a workpiece of the type comprising a motor provided with a cyclic movement output member, a tool holder adapted to carry a tool and a transmitter engaging the motor output member and the tool holder to set the tool holder in a cyclic or reciprocating movement, so that the tool itself can act on the workpiece.

Known rail saws as one example of the aforementioned apparatusses, in particular rail saws using a disc-shaped abrasive blade, require that the operator has a lot of experience, sensitivity and ability to manage in particular situations of variation in friction between the rotary abrasive disc and the rail. Indeed, the abrasive engagement of the blade with the steel of the rail can generate a sudden change in resistance to movement of the motor and thus slowing it down excessively and jamming it. Apart from slowing down the truncation of the rails and reducing the lifetime of the components of the rail saw, such jamming and tearing of the motor lead to jarring and locking of the abrasive blade in the steel of the rail with a risk of breaking the blade itself and injuring the operator. Similar difficulties are encountered also with known portable or in-sito rail drills, abrading tools, concrete saws etc.

The only solution currently available to avoid this difficulty is to carry out the tooling by adjusting the tool—workpiece contact pressure according to the response of the apparatus (vibrations, sound) perceived and correctly interpreted by the trained operator.

The purpose of the present invention is therefore to propose an apparatus for the tooling of a workpiece of the type specified above having characteristics such as to avoid the quoted drawbacks with reference to the prior art.

A particular purpose of the present invention is to propose a portable apparatus for the in situ tooling of workpieces, e.g. railway rails or railway sleepers, the use of which does not require a lot of experience and that is better protected from locking and jarring of the power-driven tool during operation.

These and other purposes are accomplished through an apparatus for the tooling of workpieces according to claim 1.

In accordance with an aspect of the invention, the portable apparatus for the in situ tooling of workpieces comprises a a motor with a cyclic movement output member, a tool holder adapted to carry a tool and a movement transmitter engaging the motor output member and the tool holder to set the tool holder in a cyclic movement,
wherein such transmission of movement comprises a transmission ratio adjuster that, in response to a preset reduction of the cyclic movement speed of the motor ($\omega\_m$) increases the transmission ratio ($\omega\_m/\omega\_ph$) thereby reducing the cyclic movement speed of the tool holder ($\omega\_ph$) with respect to the cyclic movement speed of the motor ($\omega\_m$).

In this way, when the motor perceives a preset increase in the resistive moment given by the resistance between the tool and the workpiece, the variation of the transmission ratio reduces the resistive torque acting on the motor and thus automatically compensates at least part of the undesired reduction in motor speed.

In accordance with a further aspect of the invention, the transmission ratio adjuster is also configured in such a way that, in response to a preset increase of the cyclic movement speed of the motor ($\omega\_m$), it decreases the transmission ratio ($\omega\_m/\omega\_ph$) thereby increasing the cyclic movement speed of the tool holder ($\omega\_ph$) with respect to the cyclic movement speed of the motor ($\omega\_m$).

Thanks to this characteristic, the apparatus compensates for instance an undesired increase in the motor speed in response to a progressive wearing of the toll, such as an abrasive disc or sawing blade. Indeed, the wearing of the abrasive disc or sawing blade would result in a decrease of its diameter and of its circumferential cutting length and, therefore, would result in a decrease of the cutting movement between the abrasive disc or sawing blade and the workpiece at each revolution of the disc or blade. This decrease of the cutting movement would involve a decrease of the resistive moment acting on the motor and, consequently, an increase in the motor speed. The transmission ratio adjuster reacts to such an increase in speed of the motor with a lowering of the transmission ratio with the result of increasing the resistive torque acting on the motor, at least partially compensating the increase in motor speed and increasing the movement speed of the tool, i.e. the abrasive disc or sawing blade (to compensate the decrease in cutting movement due to the wearing of the tool).

In order to better understand the invention and to appreciate its advantages, some non-limiting example embodiments are described hereafter, with reference to the attached figures, in which:

FIG. 3 is a partial section view according to the line III-III in FIG. 1. The cutting apparatus is in the first operating condition.

FIG. 4 is a partial section view according to the line IV-IV in FIG. 2. The cutting apparatus is in the second operating condition.

FIG. 16 is a front view of a rail junction smoothing apparatus in accordance with an embodiment of the invention;

FIG. 17 is a top view of a smoothing apparatus in FIG. 16;

Figure 2:
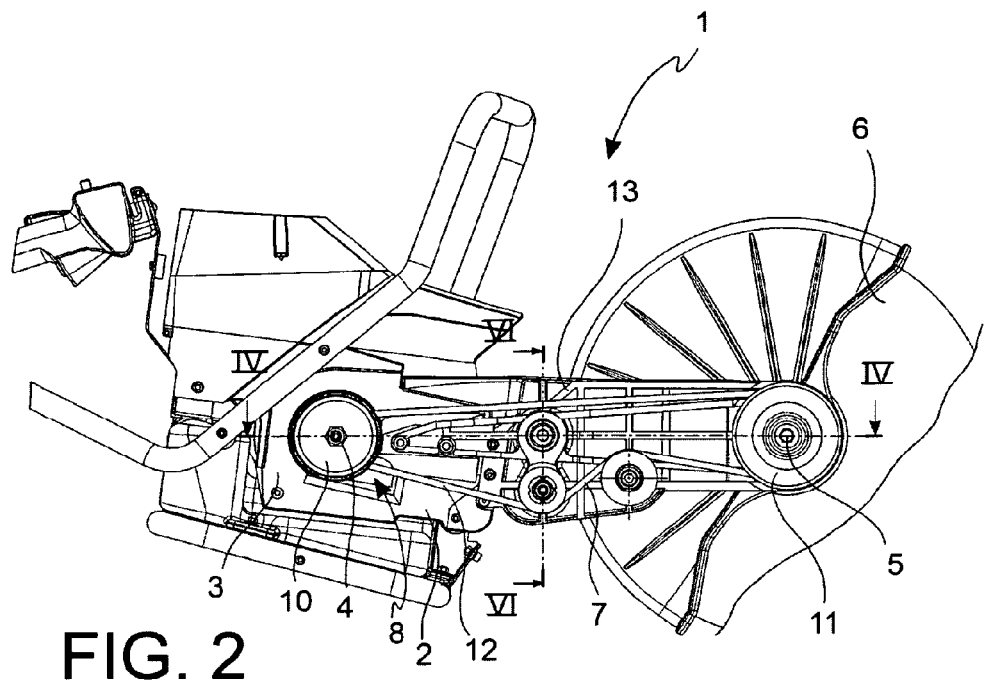
FIG. 2 shows the cutting apparatus of FIG. 1 in a second operating condition.
Figure 1:
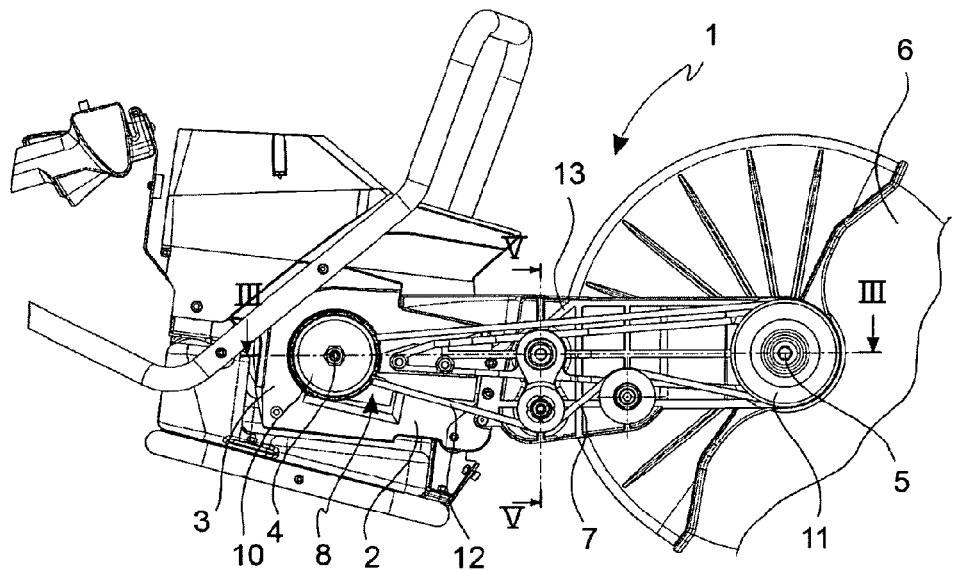
FIG. 1 is a partial side view of a cutting apparatus according to an embodiment of the invention, in which part of a protective cover is removed. The cutting apparatus is in a first operating condition.
Figure 5:
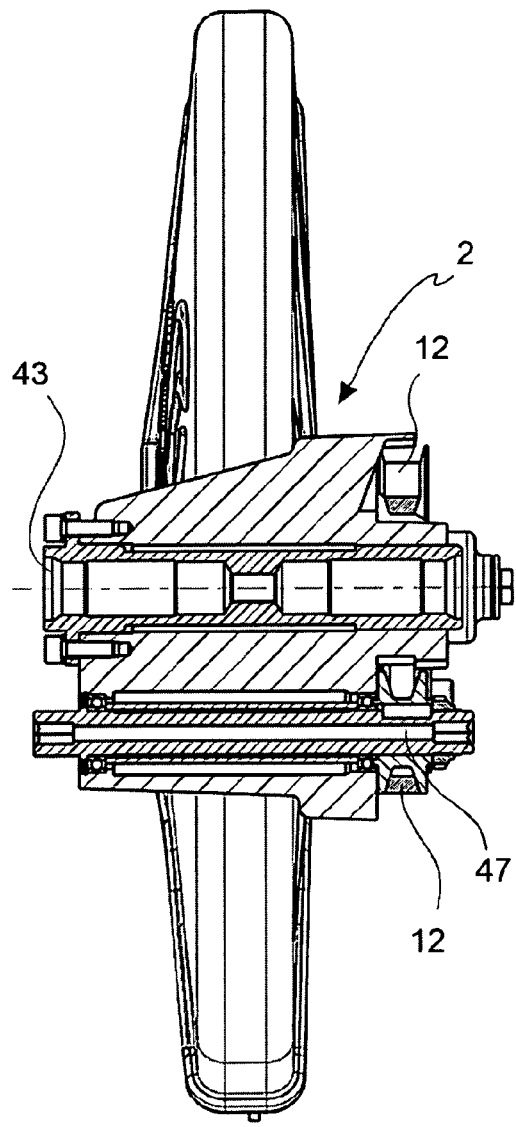
FIG. 5 is a section view according to the line V-V in FIG. 1. The cutting apparatus is in the first operating condition.
Figure 6:
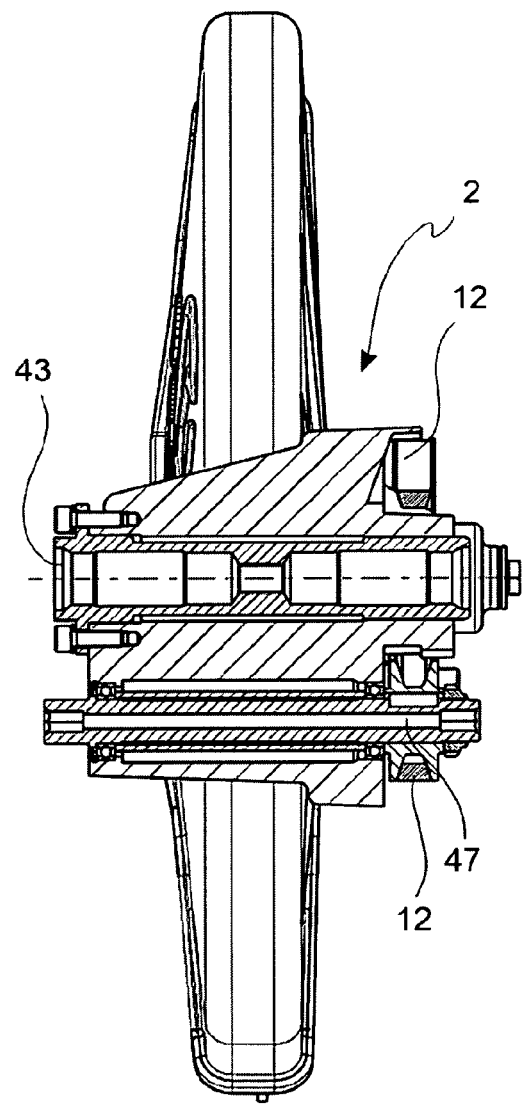
FIG. 6 is a section view according to the line VI-VI in FIG. 2. The cutting apparatus is in the second operating condition.
Figure 7:
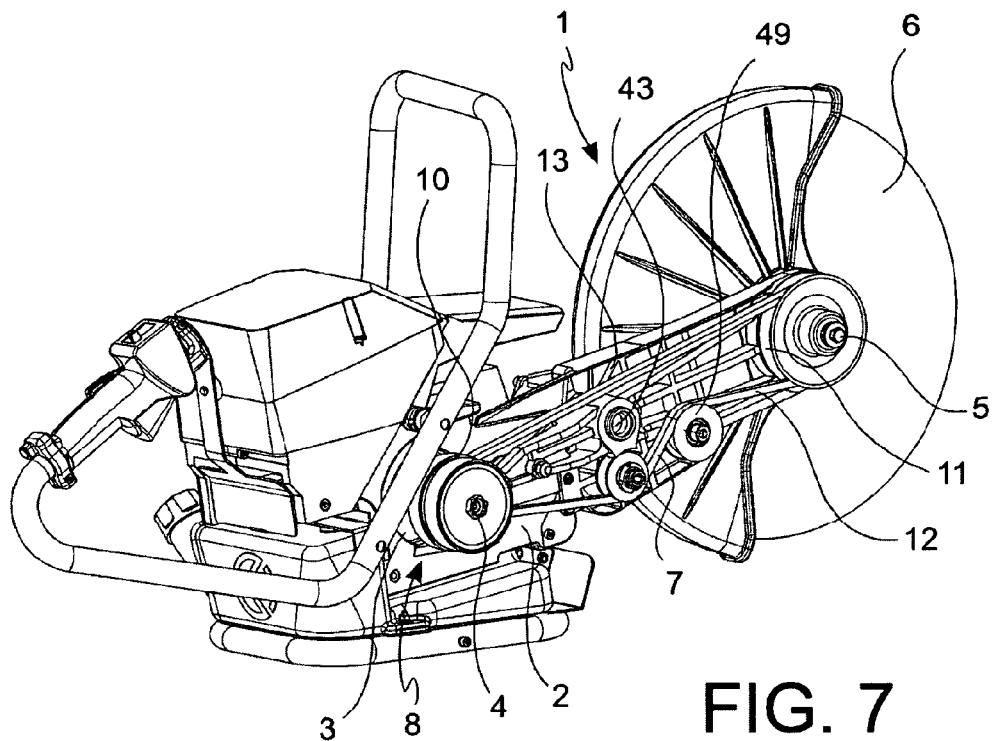
FIG. 7 is a perspective view of the cutting apparatus of FIG. 1. The cutting apparatus is in the first operating condition.
Figure 8:
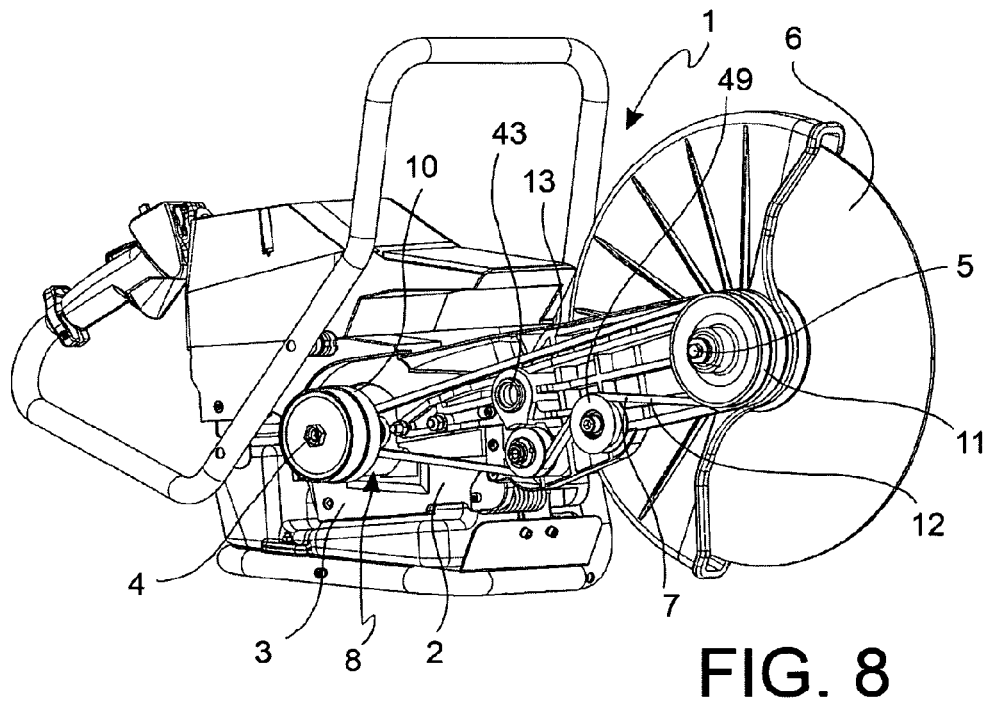
FIG. 8 is a further perspective view of the cutting apparatus of FIG. 1. The cutting apparatus is in the second operating condition.

With reference to the figures, an apparatus for the tooling of a workpiece will be described in detail by means of the non limiting embodiment of a cutting apparatus for the in situ truncation of railway rails, as well as by means of further embodiments including a drilling apparatus and a concrete saw.

A cutting apparatus 1 for the in situ truncation of railway rails comprises a rail saw 2 having a motor 3 (for example an internal combustion engine or an electric motor) with a cyclic movement output member (for example a drive shaft 4), a tool holder adapted to carry an abrasive blade (for example a rotary plate holder shaft 5 that supports an abrasive disc 6).

In the present description, the term "abrasive blade" includes all types of cutting blades adapted for cutting steel through removal of material, for example saw-toothed blades, abrasive blades, disc blades, elongated blades, etc..

The rail saw 2 also has a movement transmitter 7 (for example a belt transmission 7) that engages the output member of the motor 4 and the tool holder 5 to set the tool holder 5 in a cyclic, preferably rotary, movement.

Alternatively, the cyclic movements of the output member 4 of the motor 3 and of the tool holder 5 can be configured as alternate linear or curvilinear movements to and fro.

In accordance with an embodiment (FIGS. 1 to 8), the movement transmitter 7 comprises a transmission ratio adjuster 8 that, in response to a preset reduction of the cyclic movement speed of the motor output member 4 (in particular its angular speed $\omega\_m$) increases the transmission ratio (angular speed of the drive shaft/angular speed. of the tool holder shaft=$\omega\_m/\omega\_ph$) thereby reducing the cyclic movement speed $\omega\_ph$ of the tool holder 5 with respect to the cyclic movement speed $\omega\_m$ of the output member 4 of the motor 3.

In this way, when the motor perceives a preset increase of the resistive moment given by the resistance between the abrasive blade and the rail, the variation of the transmission ratio reduces the resistive torque that acts on the motor and thus automatically compensates at least part of the undesired reduction of the motor speed.

In accordance with a further embodiment, the transmission ratio adjuster 8 is also configured in such a way that, in response to a preset increase of the cyclic movement speed $\omega\_m$ of the output member 4 of the motor 3, it decreases the transmission ratio $\omega\_m/\omega\_ph$ thereby increasing the cyclic movement speed $\omega\_ph$ of the tool holder 5 with respect to the cyclic movement speed of the output member 4 of the motor 3.

Thanks to this characteristic, the cutting apparatus 1 compensates an undesired increase of the motor speed in response to a progressive wearing of the abrasive disc 6. Indeed, the wearing of the abrasive disc 6 results in a decrease of its diameter and of its circumferential cutting length and, therefore, it would result in a decrease in the cutting movement between the abrasive disc 6 and the rail 9 at each revolution of the disc 6. This decrease in cutting movement would lead to a decrease in the resistive moment that acts on the motor 3 and, consequently, an increase in the speed of the motor itself. The transmission ratio adjuster reacts to such an increase in speed of the motor by lowering the transmission ratio with the result of increasing the resistive torque that acts on the motor, at least partially compensating the increase in motor speed and increasing the speed of movement of the abrasive disc (to compensate the decrease in cutting movement due to the wearing of the abrasive disc).

According to an embodiment, the movement transmitter 7 comprises a motor pulley 10 coupled so as to rotate as a unit with the drive shaft 4, a driven pulley 11 coupled so as to rotate as a unit with the tool holder shaft 5 and a belt 12 with inclined sides, in particular having a trapezoidal section, wound around the motor pulley 10 and the driven pulley 11 to transmit the motor movement with a preset ratio to the tool, i.e. the abrasive disc 6.

The tool holder shaft 5 is rotatably supported by a support arm 13 connected to a motor housing 14 of the rail saw 2. The motor pulley 10 comprises a first half-pulley 14 and a second half-pulley 15 that together define a first belt seat 16 with inclined side surfaces 17. The second half-pulley 15 is axially (with respect to the axis of the drive shaft) moveable with respect to the first half-pulley 14, so as to bring the inclined side surfaces 17 toward and away from one another to move the first belt seat 16 and the belt 12 radially outwards or inwards. Advantageously, the relative position between the first and the second half-pulley and, therefore, the diameter of the first belt seat 16 is adjusted through a centrifugal force generated according to the angular speed $\omega\_m$ of the drive shaft 4.

For this purpose it is possible to provide two or more thrusting bodies 18 provided with a calibrated mass and received in special thrusting seats 19 formed from a thrusting surface 20 of at least one of the two half-pulleys 14, 15 and an abutment surface 21, configured so as to transform the centrifugal thrust of the thrusting bodies 18 into corresponding relative (axial) movements of the half-pulleys 14, 15.

In accordance with the embodiment illustrated in FIGS. 3 and 4, the first half-pulley 14 is stationary and arranged on the motor side, the second half-pulley 15 is axially moveable and the centrifugal thrust of the thrusting bodies 18 tends to move the second half-pulley 15 (against the tension force of the belt 12) towards the first half-pulley 14, taking the first belt seat 16 and the belt 12 for example from a radially inner rest position (motor off or clutch disengaged or insufficient motor speed to activate the variation of the transmission ratio), FIGS. 2, 4, 6, 8) to a radially outer initial position (motor on and clutch engaged and sufficient motor speed to activate the variation of the transmission ratio, for example in the absence of pressing contact between abrasive blade and rail, FIGS. 1, 3, 5, 7).

When, during cutting, the motor 3 perceives a high resistive moment, it slows down, lowering the centrifugal thrust of the thrusting bodies 18. Consequently, the tension of the belt 12 overcomes the centrifugal thrust of the thrusting bodies 18 and takes apart the two half-pulleys 14, 15 and moves the first belt seat 16 together with the belt 12 from the radially outer initial position to a first radially inner compensation position (FIGS. 2, 4, 6, 8) that increases the speed of the drive shaft 4 with respect to the speed of the tool holder 5 to avoid jamming or choking of the motor.

Similarly, following high wear of the abrasive disc 6 with consequent reduction in diameter, the motor 3 perceives a decreased resistive moment and increases in speed. This results in an increase in centrifugal thrust of the thrusting bodies 18 that move the first belt seat 16 together with the belt 12 from their previous radially inner position to a second radially outer compensation position (FIGS. 1, 3, 5, 7) that lowers the speed of the drive shaft 4 with respect to the speed of the tool holder 5 to contain both the increase in motor speed and the lowering of the peripheral speed of the abrasive disc 6.

The effectiveness of this automatic adjustment of the transmission ratio $\omega\_m/\omega\_ph$ can be further improved by using the variation in tension of the belt 12 due to the variation in diameter of the motor pulley 10, i.e. of its first belt seat 16, to vary the diameter of the driven pulley 11 in the opposite or inverse direction.

For this purpose it is possible to provide for the driven pulley 11 to be configured so as to adjust its diameter, i.e. the diameter of a second belt seat 22 thereof according to the tension of the belt 12, so that:

- as the tension of the belt 12 increases (that corresponds to an increase in the diameter of the first belt seat 16 of the motor pulley 10), the diameter of the second belt seat 22 of the driven pulley 11 decreases and
- as the tension of the belt 12 decreases (that corresponds to a decrease in the diameter of the first belt seat 16 of the motor pulley 10), the diameter of the second belt seat 22 of the driven pulley 11 increases.

In accordance with an embodiment (FIGS. 3 and 4), the driven pulley 11 comprises a first half-pulley 23 and a second half-pulley 24 that together define the second belt seat 22 with inclined side surfaces 25. The second half-pulley 24 is axially (with respect to the axis of the tool holder shaft 5) moveable with respect to the first half-pulley 23, so as to be able to bring the inclined side surfaces 25 towards or away from one another to move the second belt seat 22 and the belt 12 radially outwards or inwards. A helical spring 26 acts permanently on the second half-pulley 24 to bias the inclined side surfaces 25 towards a position relatively brought together in which the second belt seat 22 and the belt 12 are positioned on a radially outer circumference. The relative position between the first and the second half-pulley of the driven pulley and, therefore, the diameter of the second belt seat 22 are adjusted according to the ratio between the tension of the belt 12, the elastic force of the spring 26 and the angle of the lateral sides of the belt.

The driven pulley 11 with its second elastically expandable belt seat 22 also performs the function of a belt-tightening device, completely avoiding further devices for tightening the belt 12. This belt-tightening function of an elastically expandable pulley for example configured like the driven pulley 11 described above is considered advantageous and inventive also independently from the concept of the transmission ratio variator and could be implemented in a cutting apparatus without a transmission ratio variator.

As a non-limiting example, the movement transmission ratio can advantageously be variable within the range $\omega\_m/\omega\_ph=1.8 \ldots 3.2$, preferably $\omega\_m/\omega\_ph=2 \ldots 3$ for an internal combustion engine with a speed of about 10000 revolutions per minute, but it obviously depends upon the type of motor used and its rotation speed.

In accordance with a further embodiment, a clutch 51 (FIG. 3) is interposed between the drive shaft and the motor pulley 10, so that, with the clutch disengaged, the entire transmitter 7 with the transmission ratio adjuster 8 are detached from the motor and at rest. This reduces the wearing of these components and increases the operating lifetime.

Thanks to the automatic transmission ratio variator of the movement and to the consequent automatic compensation of the undesired effects discussed with reference to the prior art, a high precision cut is obtained.

Figure 14:
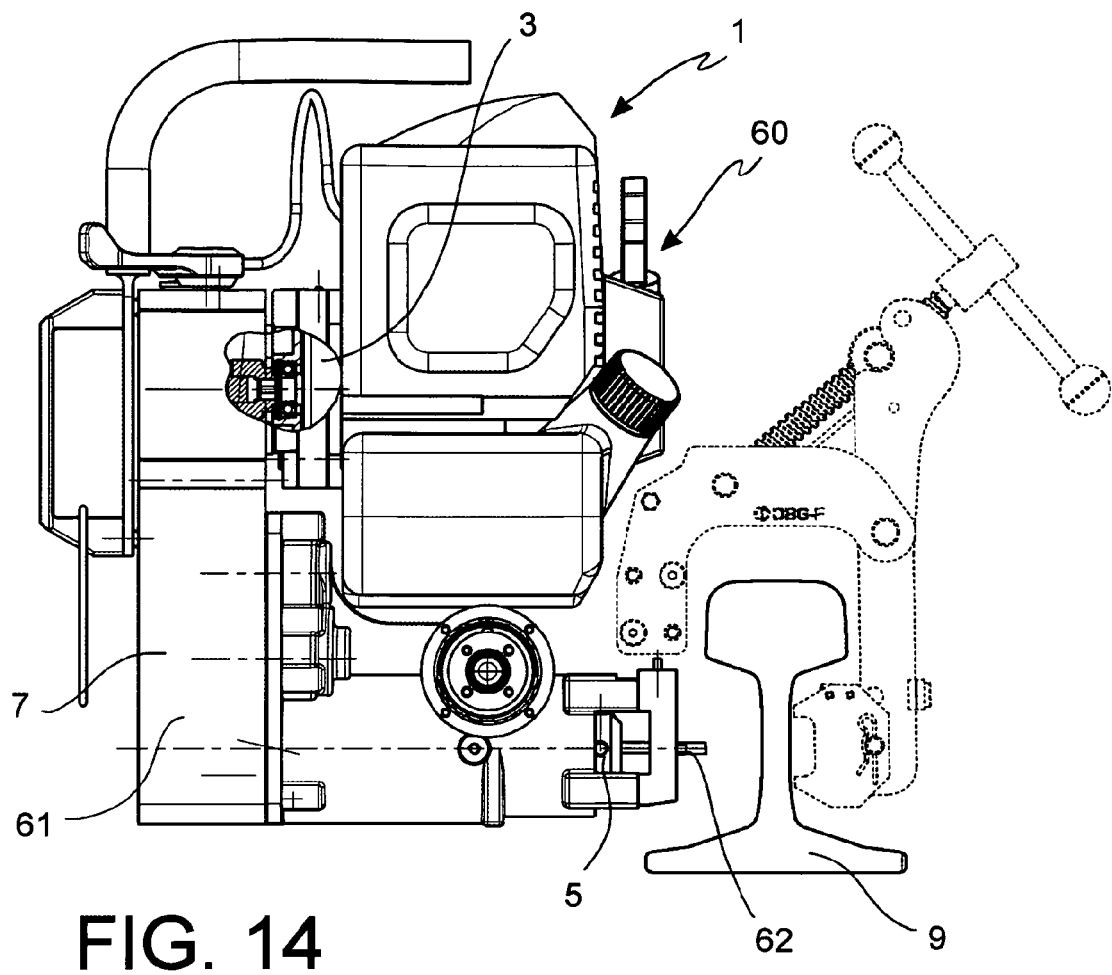
FIG. 14 is a side view of a drilling apparatus in accordance with an embodiment of the invention.
Figure 15:
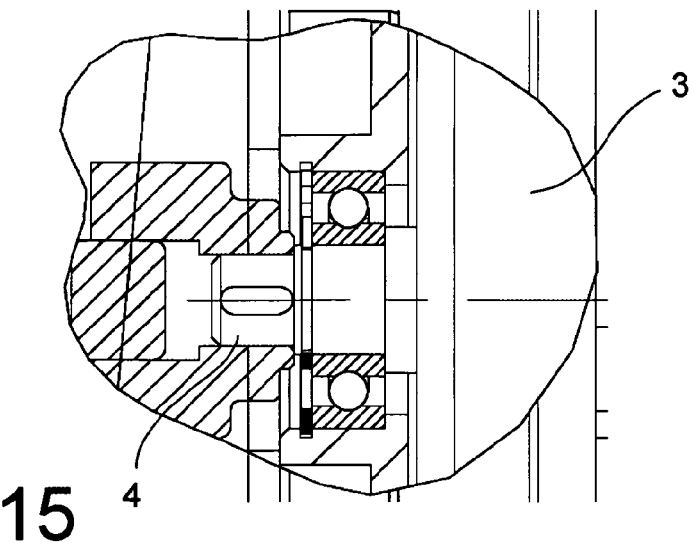
FIG. 15 illustrates a detail of the drilling apparatus in FIG. 14.
Figure 18:
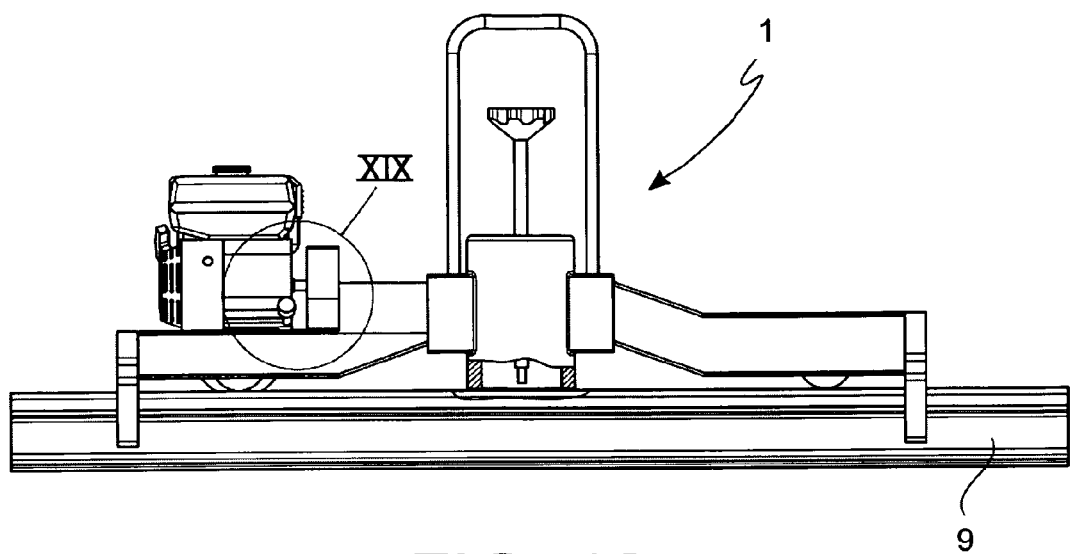
FIG. 18 is a side view of a smoothing apparatus in FIG. 16.
Figure 19:
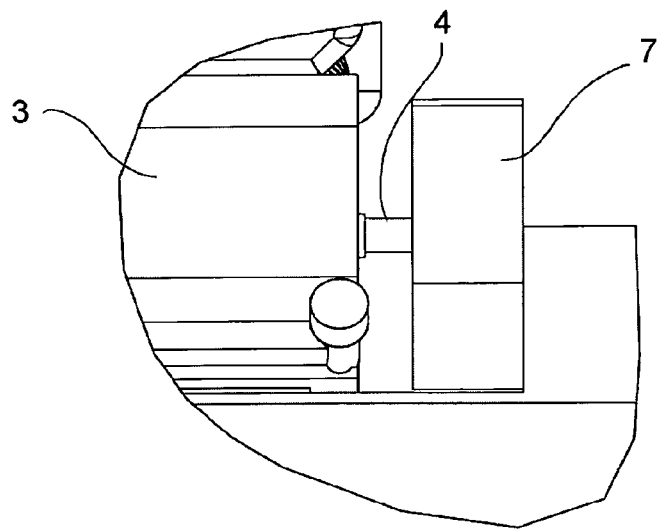
FIG. 19 illustrates a detail of the smoothing apparatus in FIG. 18.

In accordance with a further embodiment (FIGS. 14 and 15), the apparatus for the tooling of a workpiece comprises a drilling apparatus 60, particularly but not limited to a drilling apparatus for the in situ drilling of holes in railway rail webs.

The drilling apparatus 60 for the in situ drilling of railway rails comprises a drilling machine 61 having a motor 3 (for example an internal combustion engine or an electric motor) with a cyclic movement output member (for example a drive shaft 4) and a tool holder 5 adapted to carry a drill bit 62.

The drilling machine 61 also has a movement transmitter 7 (for example a belt transmission 7) that engages the output member of the motor 4 and the tool holder 5 to set the tool holder 5 in a cyclic, preferably rotary, movement.

In accordance with an embodiment, the movement transmitter 7 may be configured as the one illustrated in FIGS. 1 to 8. Particularly, the movement transmitter 7 may comprise a transmission ratio adjuster 8 that, in response to a preset reduction of the cyclic movement speed of the motor output member 4 (in particular its angular speed $\omega\_m$) increases the transmission ratio (angular speed of the drive shaft/angular speed of the tool holder shaft=$\omega\_m/\omega\_ph$) thereby reducing the cyclic movement speed $\omega\_ph$ of the tool holder 5 with respect to the cyclic movement speed $\omega\_m$ of the output member 4 of the motor 3.

In this way, when the motor perceives a preset increase of the resistive moment given by the resistance between the drill bit 62 and the rail, the variation of the transmission ratio reduces the resistive torque that acts on the motor and thus automatically compensates at least part of the undesired reduction of the motor speed.

Further features and functions of the movement transmitter 7 have already been described in detail in connection with the embodiment of FIGS. 1-8 and are applicable analogously also to the drilling apparatus 60.

In accordance with a yet further embodiment (FIGS. 16 through 19), the apparatus for the tooling of a workpiece comprises a smoothing apparatus 63, particularly but not limited to a smoothing apparatus for the in situ smoothing of welded rail junctions.

The smoothing apparatus 63 for the in situ smoothing of railway rails comprises a smoothing machine 64 having a motor 3 (for example an internal combustion engine or an electric motor) with a cyclic movement output member (for example a drive shaft 4) and a tool holder 5 adapted to carry a sanding disk 65 or sanding belt.

The smoothing machine 64 also has a movement transmitter 7 (for example a belt transmission 7) that engages the output member of the motor 4 and the tool holder 5 to set the tool holder 5 in a cyclic, preferably rotary, movement.

Alternatively, the cyclic movements of the output member 4 of the motor 3 and of the tool holder 5 can be configured as alternate linear or curvilinear movements to and fro.

In accordance with an embodiment, the movement transmitter 7 may be configured as the one illustrated in FIGS. 1 to 8. Particularly, the movement transmitter 7 may comprise a transmission ratio adjuster 8 that, in response to a preset reduction of the cyclic movement speed of the motor output member 4 (in particular its angular speed $\omega\_m$) increases the transmission ratio (angular speed of the drive shaft/angular speed of the tool holder shaft=$\omega\_m/\omega\_ph$) thereby reducing the cyclic movement speed $\omega\_ph$ of the tool holder 5 with respect to the cyclic movement speed $\omega\_m$ of the output member 4 of the motor 3.

In this way, when the motor perceives a preset increase of the resistive moment given by the resistance between the sanding disk 65 and the rail, the variation of the transmission ratio reduces the resistive torque that acts on the motor and thus automatically compensates at least part of the undesired reduction of the motor speed.

Further features and functions of the movement transmitter 7 have already been described in detail in connection with the embodiment of FIGS. 1-8 and are applicable analogously also to the smoothing apparatus 63.

Figure 20:
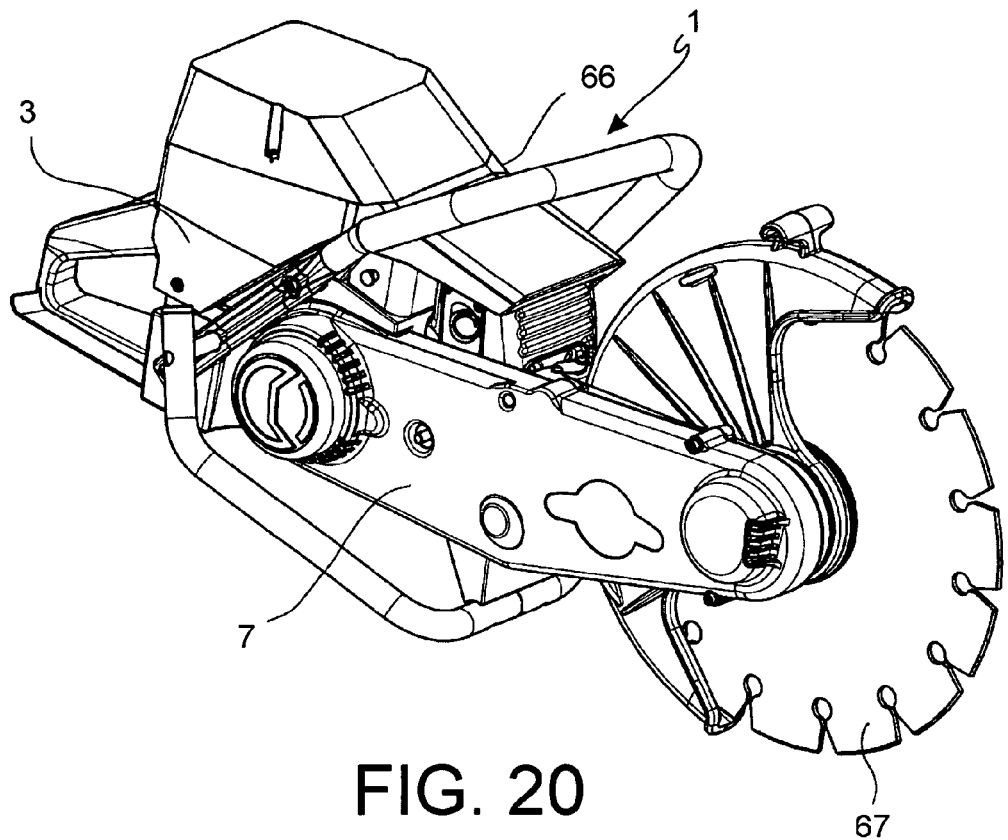
FIG. 20 is a perspective view of a concrete saw in accordance with an embodiment of the invention.
Figure 21:
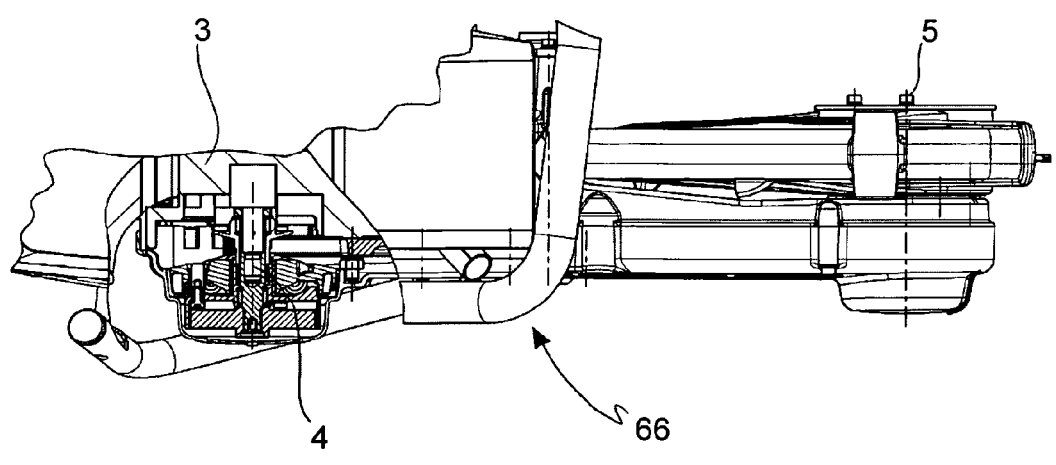
FIG. 21 illustrates a detail of the concrete saw in FIG. 20.

In accordance with a yet further embodiment (FIGS. 20 and 21), the apparatus for the tooling of a workpiece comprises a power-driven saw 66, particularly but not limited to a concrete saw for the in situ cutting of railway sleepers.

The saw 64 comprises a motor 3 (for example an internal combustion engine or an electric motor) with a cyclic movement output member (for example a drive shaft 4) and a tool holder 5 adapted to carry a sawing blade 67.

The saw 66 also has a movement transmitter 7 (for example a belt transmission 7) that engages the output member of the motor 4 and the tool holder 5 to set the tool holder 5 in a cyclic, preferably rotary, movement.

Alternatively, the cyclic movements of the output member 4 of the motor 3 and of the tool holder 5 can be configured as alternate linear or curvilinear movements to and fro.

In accordance with an embodiment, the movement transmitter 7 may be configured as the one illustrated in FIGS. 1 to 8. Particularly, the movement transmitter 7 may comprise a transmission ratio adjuster 8 that, in response to a preset reduction of the cyclic movement speed of the motor output member 4 (in particular its angular speed $\omega\_m$) increases the transmission ratio (angular speed of the drive shaft/angular speed of the tool holder shaft=$\omega\_m/\omega\_ph$) thereby reducing the cyclic movement speed $\omega\_ph$ of the tool holder 5 with respect to the cyclic movement speed $\omega\_m$ of the output member 4 of the motor 3.

In this way, when the motor perceives a preset increase of the resistive moment given by the resistance between the sawing blade 67 and the rail, the variation of the transmission ratio reduces the resistive torque that acts on the motor and thus automatically compensates at least part of the undesired reduction of the motor speed.

Further features and functions of the movement transmitter 7 have already been described in detail in connection with the embodiment of FIGS. 1-8 and are applicable analogously also to the saw 66.

Turning now back to the cutting apparatus 1, in accordance with a further embodiment (FIGS. 9-13), the cutting apparatus 1 also comprises a linkage structure 27 having a base portion 28 with a rail connector 29 for locking the linkage structure 27 to the rail 9 to be truncated and a guide arm 30 with a saw connector 31 for locking the rail saw 2 to the linkage structure 27. The guide arm 30 is movably linked to the base portion 28 such as to allow a first guided movement (arrow I in FIG. 10) of the rail saw 2 locked to the saw connector 31 toward and away from the rail 29 to which the rail connector 29 is locked.

This, on the one hand, allows mechanical fixing of the position and direction of movement of the abrasive blade 6 with respect to the rail 9 and thus high cutting precision and, on the other hand, allows guided support of at least part of the weight of the rail saw 2 during the truncation of the rail 9.

The first guided movement I of the guide arm 30 with respect to the base portion 28 is preferably a rotary movement (guide arm 30 hinged to the base portion 28), but, alternatively, it can be a linear or curved translation movement (guide arm 30 slidably coupled with the base portion 28).

In any case, such a first guided movement I of the guide arm 30 is parallel to a cutting plane of the abrasive blade 6.

The guide arm 30 is advantageously invertible with respect to the base portion 28 so as to allow easy positioning and actuation of the rail saw 2 on both sides of the rail 9 without having to dismount the base portion 28 from the rail.

Such an inversion can be obtained through a rotation of the guide arm 30 around the same fulcrum 39 that also determines the first guided movement I.

Figure 9:
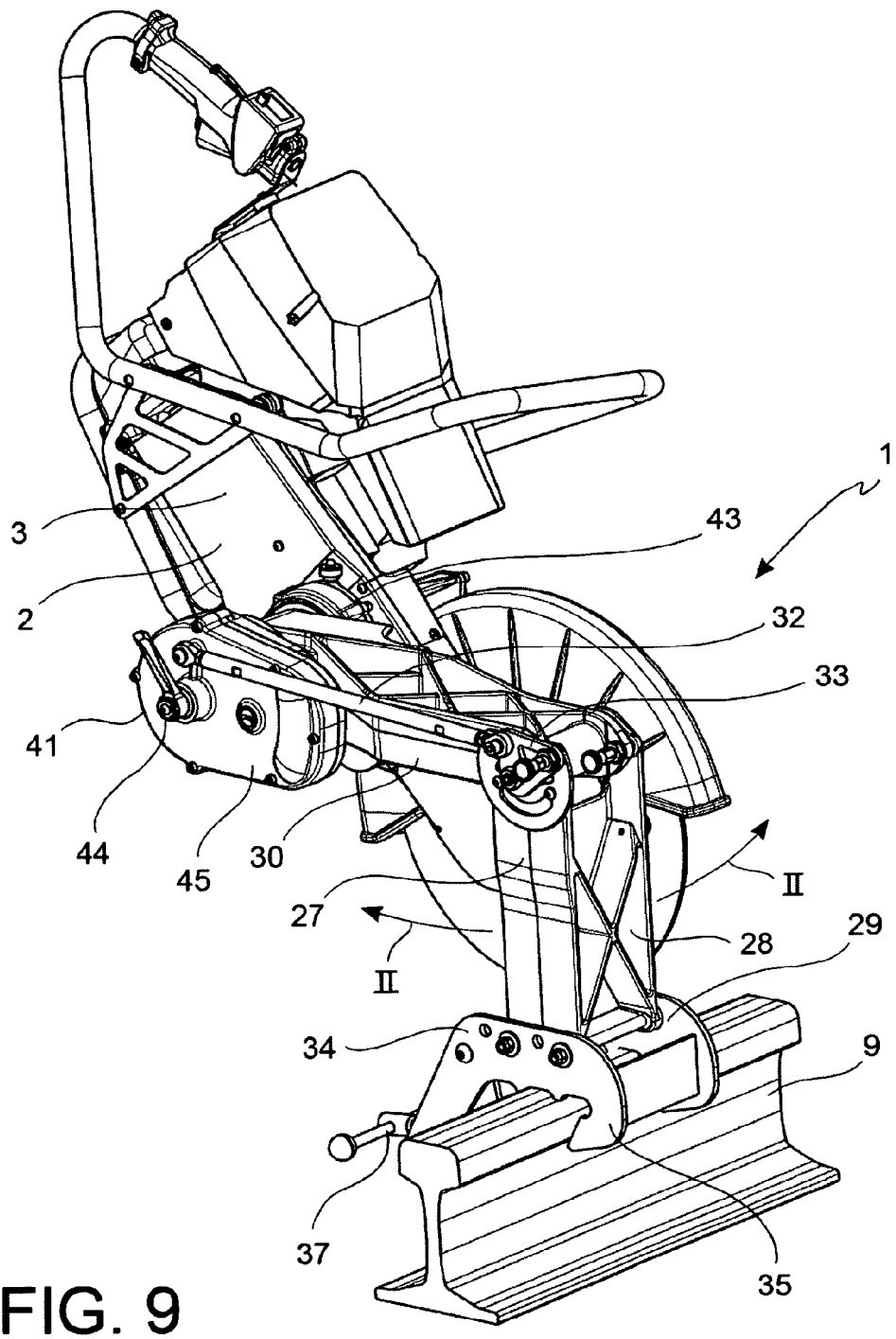
FIG. 9 is a perspective view of a cutting apparatus according to an embodiment of the invention.

The linkage structure 27 also comprises saw orienting means configured to determine the orientation of the rail saw 2 along the movement path of the guide arm, for example by means of one or more orientation bars 32 articulated to the guide arm 30 and to the base portion 28 so as to form an articulated quadrilateral (FIG. 9).

In order to allow the guide arm 30 to be inverted, the orientation bar 32 is articulated to the base portion 28 through an orientation plate 33 that is moveable between two preset different positions so as to determine the correct orientation of the rail saw 2 in both of the mutually inverted configurations.

The rail connector 29 can comprise a clamping vice 34 with a fixed jaw 35 and a mobile jaw 36 hinged to the fixed jaw 35 and pushed into engagement against the rail 9 by a locking screw 37 with a handle that acts between the mobile jaw 36 and a contrast portion 38 of the fixed jaw 35.

The saw connector 31 can be arranged in the vicinity of a free end 41 of the guide arm 30 and can comprise a centring and coupling portion 42 (for example a centring pin and an anti-rotation coupling surface) adapted to engage a corresponding centring and coupling seat 43 (for example a pin seat and a corresponding anti-rotation coupling surface) of the rail saw 2, as well as a locking screw 44 to pull the centring and coupling portion 42 into engagement with the centring and coupling seat 43.

Figure 10:
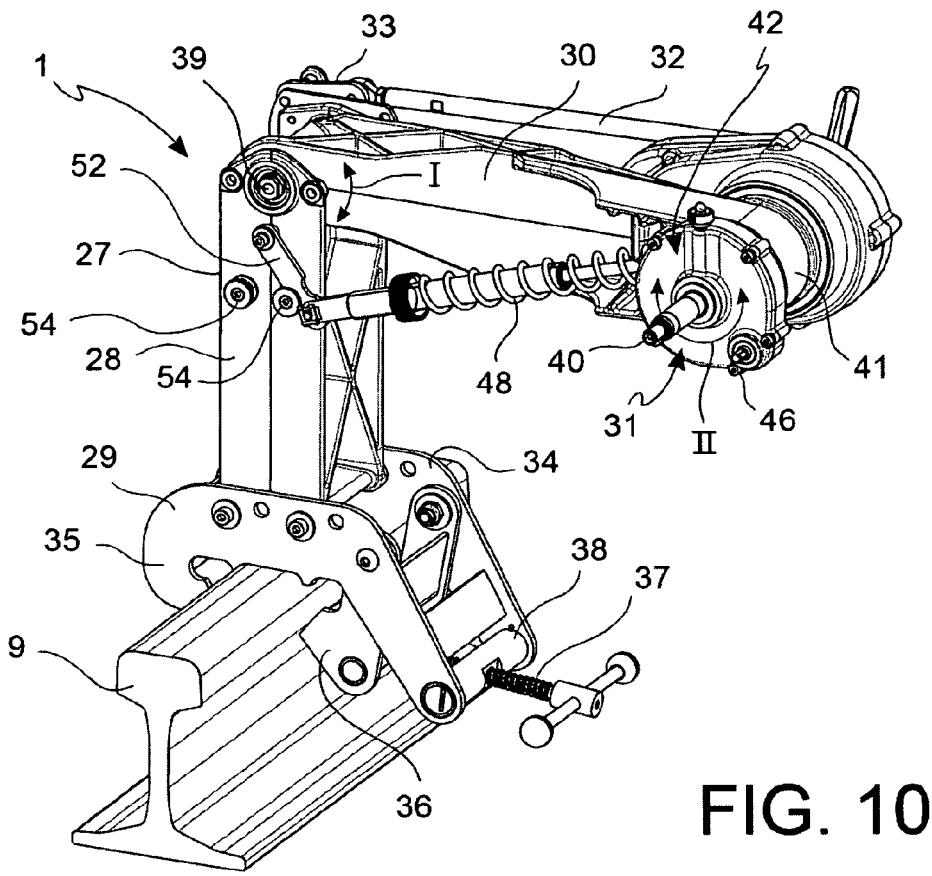
FIG. 10 is a perspective view of a detail of the cutting apparatus in FIG. 9.

According to an aspect of the invention, the portable cutting apparatus 1 comprises a sawing position alternator 45 (hereafter called "position alternator 45") interposed between the guide arm 30 and the tool holder 5 and configured to autonomously and alternately move the tool holder 5 to and fro with respect to the guide arm 30 (arrow II in FIGS. 9 and 10).

This configuration of the cutting apparatus 1 autonomously produces an alternating cutting movement, allowing unassisted in situ truncation of the rail (in other words without the direct intervention of an operator) through a portable apparatus. This substantially reduces the risk of injury and harm to health due to an unhealthy work posture, to the massive presence of sparks, abrasion dust and to the proximity of the moving abrasive blade. The portable cutting apparatus thus configured does not require either an experienced and trained workforce or particular strength and physical fitness of the operator.

The alternating movement II of the tool holder 5 generated by the position alternator 45 is parallel to the plane of the first movement I of the guide arm 30 and determines an arched trajectory of the abrasive blade 6 generated through an alternating rotary movement of the entire rail saw 2 around a second fulcrum 40 defined in the guide arm 30 and spaced from the first fulcrum 39 (FIGS. 9 and 10).

Alternatively, the alternating movement II of the tool holder 5 can occur along a linear or mixed curved—linear trajectory.

The cutting apparatus 1 thus configured autonomously carries out a combined sawing movement of the rail, which includes the aforementioned first movement I of the guide arm 30 with respect to the base portion 28 and said second alternating movement II of the tool holder 5 with respect to the guide arm 30.

In accordance with an embodiment, the position alternator 45 is functionally interposed between the guide arm 30 and the rail saw 2, in other words its centring and coupling seat 43.

Advantageously, the saw connector 31 transmits the alternating movement II from the position alternator 45 to the rail saw 2.

The alternator 45 itself is advantageously an alternator using a cam, preferably an eccentric cam and even more preferably a desmodromic cam 50 (FIG. 11), actuated through a driving shaft 46 projecting from the saw connector 31 and suitable for torque-resistantly engaging a power take-off 47, preferably a pulley, said power take-off being coupled with the transmitter 7 of the rail saw 2. In this way, the kinetic energy for the actuation of the position alternator 45 is taken from the motor 3 through the transmitter 7.

Figure 11:
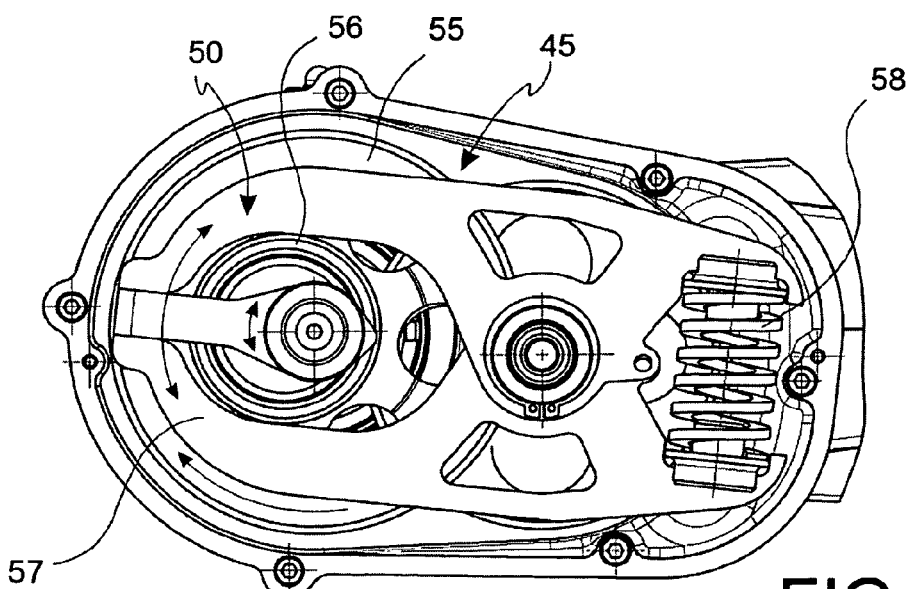
FIG. 11 is a side view of a further detail of the cutting apparatus in FIG. 9.
Figure 12:
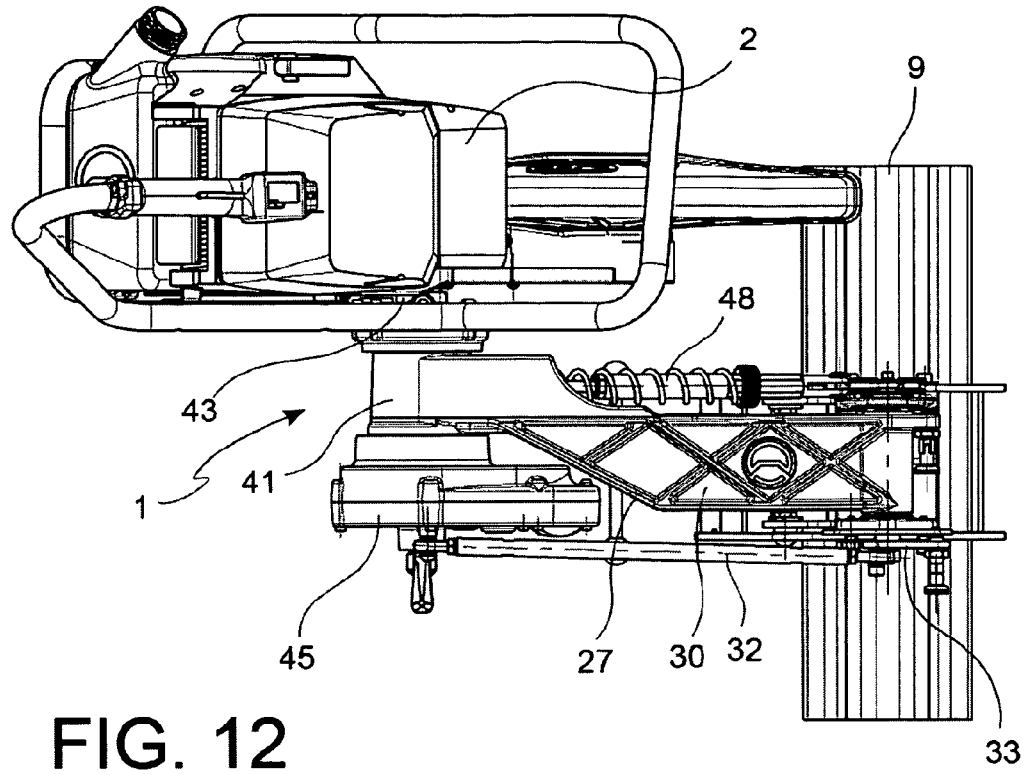
FIG. 12 is a view from above of the cutting apparatus in FIG. 9.
Figure 13:
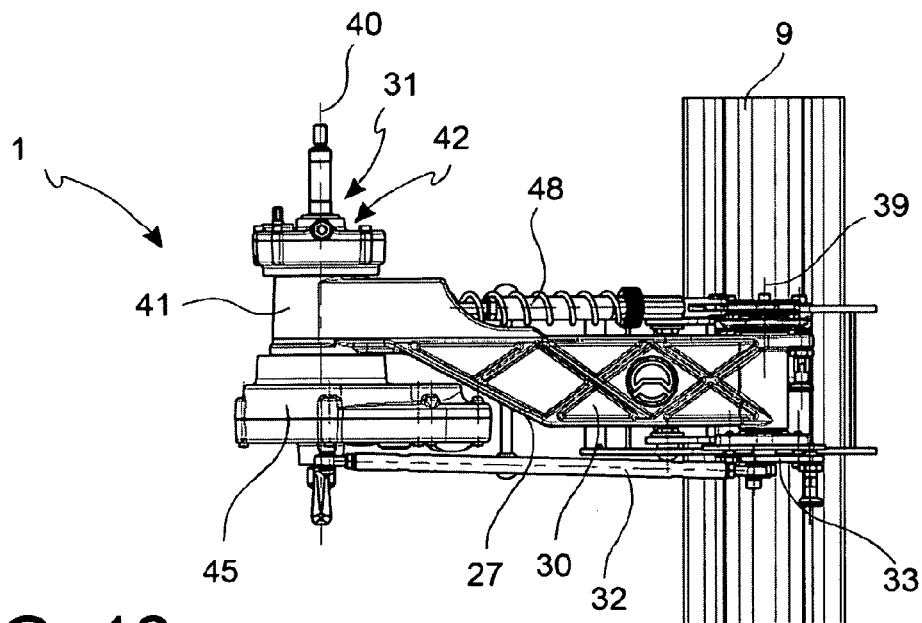
FIG. 13 is a view from above of a detail of the cutting apparatus in FIG. 9.

In accordance with the embodiment illustrated in FIG. 11, the rotary motion of the driving shaft 46 is transmitted through a series of gears to a gear wheel 55 with an eccentric cam 56 that engages a cam-follower 57 (moving it alternately) in turn connected to the centring and coupling portion 42. The cam-follower 57 comprises two portions able to be moved apart against the elastic force of a spring 58, to allow the elastic decoupling of the position alternator in the case of high resistance to movement.

In order to ensure an effective coupling between the power take-off pulley 47 and the belt 12 of the transmitter 7, the latter can comprise a further return pulley 49 arranged in the vicinity of the power take-off pulley 47 so as to increase the contact length between the belt 12 and the power take-off pulley 47.

Thanks to the desmodromic cam mechanism, the position alternator 45 is configured to drive the alternating movement II up to a preset resistance force to such a movement, beyond which the position alternator 45 uncouples from the transmission of the alternating movement II, thus avoiding damage to the cutting apparatus 1.

Advantageously, the centring and coupling seat 43 is formed on both of the opposite sides of the rail saw 2 and/or the driving shaft 46 of the alternator 45 can engage the power take-off 47 on both of the opposite sides of the rail saw 2, making it possible to couple the rail saw 2 on one or other of its sides with the guide arm 30, which is useful in the case of inversion of the guide arm 30 and continued cutting on the opposite side of the rail.

In order to contrast a part of the weight of the rail saw 2 and of the guide arm 30 and to promote movement of the abrasive blade 6 that is as continuous as possible without jumps, tears or bouncing, it is possible to provide a suspension or spring-damper group 48 arranged between the base portion 28 and the guide arm 30 of the linkage structure 27.

The suspension 48 is articulated to the base portion 28 through a connecting rod 52 configured to rest, respectively, against one of two stop portions 54, according to the inverted position of the guide arm 30.

The linkage and movement features described in detail in connection with the embodiment of a rail cutting apparatus may be also applied in connection with the described apparatus for tooling a workpiece in general, particularly with the drilling apparatus 60, smoothing apparatus 63 or concrete saw 66.

The man skilled in the art can appreciate that the individual embodiments and the characteristics of the apparatus for tooling a workpiece described up to now are each per sé advantageous in light of the prior art and in combination obtain synergic positive effects, in particular with reference to the ease of execution and the precision of the tooling, e.g. cutting, smoothing, drilling, sawing, the lifetime of the apparatus, the protection of the operator's health and the versatile and portable use of the apparatus.

The invention claimed is:

1. Apparatus for the tooling of a workpiece, comprising:
a motor with a cyclic movement output member,
a tool holder adapted to carry a tool and a movement transmitter engaging the motor output member and the tool holder to set the tool holder in a cyclic movement, wherein the movement transmitter comprises:
a transmission ratio adjuster that, in response to a preset reduction of the cyclic movement speed of the motor output member, automatically increases the transmission ratio thereby reducing the cyclic movement speed of the tool holder with respect to the cyclic movement speed of the output member of the motor,
a motor pulley coupled so as to rotate with a drive shaft,
a driven pulley coupled so as to rotate with a tool holder shaft, and
a belt wound around the motor pulley and the driven pulley, wherein said motor pulley has a first belt seat, the diameter of which is adjusted through centrifugal fore,
wherein said motor pulley comprises:
a first half-pulley and a second half-pulley that together define a first belt seat with inclined side surfaces, the second half-pulley being moveable with respect to the first half-pulley to move the first belt seat and the belt radially outwards or inwards,
two or more thrusting bodies having a calibrated mass and received in thrusting seats formed by a thrusting surface of at least one of the two half-pulleys and an abutment surface, configured so as to transform the centrifugal thrust of the thrusting bodies into said relative movements of the half-pulleys.

2. Apparatus according to claim 1, wherein the transmission ratio adjuster is also configured in such a way that, in response to a preset increase of the cyclic movement speed of the output member of the motor, it decreases the transmission ratio thereby increasing the cyclic movement speed of the tool holder with respect to the cyclic movement speed of the output member of the motor.

3. Apparatus according to claim 1, wherein the cyclic movements of the output member of the motor and of the tool holder are rotary movements.

4. Apparatus according to claim 1, wherein said driven pulley is configured so as to adjust the diameter of a second belt seat thereof according to and by means of the tension of the belt, so that:
an increase of the tension of the belt decreases the diameter of the second belt seat and a decrease of the tension of the belt increases the diameter of the second belt seat.

5. Apparatus according to claim 4, wherein said driven pulley comprises:
a first half-pulley and a second half-pulley that define said second belt seat, said second half-pulley being moveable with respect to the first half-pulley to move the second belt seat and the belt radially outwards or inwards,
a spring that acts permanently on the second half-pulley to bias the second belt seat and the belt against the tension force of the belt towards a radially outer circumference.

6. Apparatus according to claim 1, wherein a second belt seat of the driven pulley is elastically expanding and acts as a belt-tightening device.

7. Apparatus according to claim 1, configured as a portable device for the in-situ tooling of said workpiece.

8. Apparatus according to claim 7, comprising a sawing position alternator interposed between the guide arm and the tool holder and configured to autonomously and alternately move the tool holder to and fro with respect to the guide arm.

9. Apparatus according to claim 1, comprising a rail saw for the truncation of railway rails, in which said tool holder is adapted to carry an abrasive blade.

10. Apparatus according to claim 9, comprising a linkage structure having a base portion with a rail connector for locking the linkage structure to the rail to be truncated and a guide arm with a saw connector for locking the rail saw to the linkage structure, said guide arm being movably linked to the base portion such as to allow a first guided movement of the rail saw locked to the saw connector toward and away from the rail.

11. Apparatus according claim 1, comprising a drilling machine, in which said tool holder is adapted to carry a drill bit.

12. Apparatus according to claim 1, comprising a smoothing machine, in which said tool holder is adapted to carry a sanding disk or sanding belt.

13. Apparatus according to claim 1, comprising a saw, in which said tool holder is adapted to carry a sawing blade.

14. Apparatus for the tooling of a workpiece, comprising:
a motor with a cyclic movement output member,
a tool holder adapted to carry a tool and a movement transmitter engaging the motor output member and the tool holder to set the tool holder in a cyclic movement,
wherein the movement transmitter comprises:
a transmission ratio adjuster that, in response to a preset reduction of the cyclic movement speed of the motor output member, automatically increases the transmission ratio thereby reducing the cyclic movement speed of the tool holder with respect to the cyclic movement speed of the output member of the motor,
a motor pulley coupled so as to rotate with a drive shaft,
a driven pulley coupled so as to rotate with a tool holder shaft, and
a belt wound around the motor pulley and the driven pulley,
said motor pulley having a first belt seat the diameter of which is automatically adjusted through centrifugal force, wherein a variation of the diameter of said first belt seat brings about a variation of the tension of the belt,
said driven pulley having a second belt seat, the diameter of which is automatically adjusted through the tension of the belt, thereby inversely varying the diameter of the second belt seat with respect to said variation of the diameter of said first belt seat.

15. Apparatus for the tooling of a workpiece according to claim 14, in which said drive shaft and said tool holder shaft are arranged at a fixed distance to one another, said fixed distance remaining fixed during said varying the diameters of the first and second belt seats.

16. Apparatus for the tooling of a workpiece, comprising:
a motor with a cyclic movement output member,
a tool holder adapted to carry a tool and a movement transmitter engaging the motor output member and the tool holder to set the tool holder in a cyclic movement,
wherein the movement transmitter comprises:
a transmission ratio adjuster that, in response to a preset reduction of the cyclic movement speed of the motor output member, automatically increases the transmission ratio thereby reducing the cyclic movement speed of the tool holder with respect to the cyclic movement speed of the output member of the motor,
a motor pulley coupled so as to rotate with a drive shaft,
a driven pulley coupled so as to rotate with a tool holder shaft, and
a belt wound around the motor pulley and the driven pulley, said drive shaft and said tool holder shaft being arranged at a fixed distance to one another, said motor pulley having a first belt seat the diameter of which is automatically adjusted through centrifugal force, wherein a variation of the diameter of said first belt seat brings about a variation of the tension of the belt,
said driven pulley having a second belt seat, the diameter of which is automatically adjusted through the tension of the belt, thereby inversely varying the diameter of the second belt seat with respect to said variation of the diameter of said first belt seat, so that:
a reduction of the cyclic movement speed of the motor output member decreases the diameter of the motor pulley first belt seat and increases the diameter of the driven pulley second belt seat, while keeping said drive shaft and said tool holder shaft at said fixed distance to one another, and
an increase of the cyclic movement speed of the motor output member increases the diameter of the motor pulley first belt seat and decreases the diameter of the driven pulley second belt seat, while keeping said drive shaft and said tool holder shaft at said fixed distance to one another.

* * * * *